(12) United States Patent
Collins et al.

(10) Patent No.: US 7,087,909 B2
(45) Date of Patent: Aug. 8, 2006

(54) STORAGE PHOSPHOR CASSETTE

(75) Inventors: James D. Collins, Penfield, NY (US);
William C. Wendlandt, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/975,874

(22) Filed: Oct. 28, 2004

(65) Prior Publication Data
US 2006/0091320 A1    May 4, 2006

(51) Int. Cl.
*H05B 33/00* (2006.01)
(52) U.S. Cl. .................................... 250/484.4
(58) Field of Classification Search ......... 250/484.4
See application file for complete search history.

(56) References Cited
U.S. PATENT DOCUMENTS

| | | |
|---|---|---|
| 5,276,333 A | 1/1994 | Robertson |
| 5,483,081 A | 1/1996 | Hosoi |
| 5,861,631 A | 1/1999 | Wendlandt et al. |
| 5,869,839 A | 2/1999 | Wendlandt et al. |
| 5,943,390 A | 8/1999 | Wendlandt et al. |
| 6,455,868 B1 | 9/2002 | Arakawa |
| 6,462,352 B1 | 10/2002 | Matsumoto et al. |
| 6,479,834 B1 * | 11/2002 | Suzuki ................. 250/584 |
| 6,528,796 B1 * | 3/2003 | Kaifu et al. ......... 250/370.11 |
| 6,683,315 B1 | 1/2004 | Wendlandt et al. |

* cited by examiner

*Primary Examiner*—David Ponta
*Assistant Examiner*—Marcus Taningco
(74) *Attorney, Agent, or Firm*—Susan L. Parulski

(57) ABSTRACT

A storage phosphor cassette including a shell having a cavity and a storage phosphor assembly having a substantially rigid plate. The rigid plate is adapted to be removably contained within the cavity of the shell and is also comprised of a material which is optically and/or radiographically transparent. A single storage phosphor screen is supported on one side of the substantially rigid plate such that both surfaces of the storage phosphor screen are optically and/or radiographically visible. In a preferred embodiment, the rigid plate can be comprised of one or more layers of clear acrylic, or at least one layer of glass disposed intermediate two layers of clear acrylic.

11 Claims, 8 Drawing Sheets

STORAGE PHOSPHOR CASSETTE

FIELD OF THE INVENTION

The invention relates generally to cassettes for imaging, and in particular to a cassette of the kind used in computed radiography.

BACKGROUND OF THE INVENTION

The field of computed radiography (CR) is well known. In the field of computed radiography, a photographic element has an image formed thereon by x-rays. The photographic element is subsequently provided to a reader wherein the element is stimulated to emit a radiation pattern that is indicative of the image formed by the x-rays. Typically, storage phosphors are used to capture radiographic images from incident x-rays. Most radiographic procedures are carried out within normal room lighting conditions, accordingly, a primary requirement for any computed radiography x-ray cassette is to shield the storage phosphor from exposure by ambient light.

One kind of cassette used in computed radiography can comprise a container having upper and lower parts that are hinged together so they can be opened for insertion of a flexible film sheet comprising the photographic element. The cassette is closed and latched so that the cassette with the photographic element therein can be used with an x-ray apparatus to produce an image on the photographic element. The cassette is then taken to a reader where the cassette is opened and the photographic element is extracted by suitable feeders, such as a suction feeding device. The photographic element separates from the cassette and is transported through the reader where it is stimulated to emit a radiation pattern that is captured for storage and use. The radiation pattern is subsequently erased from the photographic element before being returned to the cassette for re-use. U.S. Pat. No. 5,276,333 (Robertson), commonly assigned and incorporated herein by reference, disclosed such a cassette.

Another kind of cassette used in computed radiography is disclosed in U.S. Pat. No. 5,861,631 (Wendlandt), U.S. Pat. No. 5,869,839 (Wendlandt), U.S. Pat. No. 5,943,390 (Wendlandt), and U.S. Pat. No. 6,683,315 (Wendlandt), all commonly assigned and incorporated herein by reference. In this kind of cassette, generally shown in FIGS. 1 and 2, a rigid film plate supports the photographic element. As shown in FIGS. 1 and 2, cassette assembly 10 is comprised of a storage phosphor assembly 12 and a shell 14. Shell 14 includes an upper and lower panel and two side members forming a cavity 16. Storage phosphor assembly 12 includes rigid insert plate 18 adapted to be removably contained within cavity 16 of shell 14. Insert plate 18 supports storage phosphor screen 20, which includes a layer of storage phosphor. Insert plate 18 can be comprised of one or more layers, for example as shown in FIG. 2, two rigid layers (for example, aluminum) 22,24, and a honeycomb layer 26.

While such cassettes have achieved certain degrees of success in their particular applications, it may be desirable to provide a cassette having a rigid insert plate supporting a single storage phosphor screen wherein each of the two sides (i.e., front and back surfaces) of the storage phosphor screen is substantially optically and/or radiographically visible. By substantially optically visible, it is meant that both sides of the screen are detectable using an optical means/device disposed on one or both sides of the screen. By substantially radiographically visible it is meant that both sides are detectable using a radiographic means/device. More particularly, that a radiation pattern disposed on the screen can be obtained from both sides using a radiographic means/device. It is recognized that a level of visibility is variable, and can be dependent on the amount of light and/or x-ray energy used/received.

In addition, it may be desirable to provide a cassette having a rigid insert plate supporting a storage phosphor screen on both sides of the insert plate wherein at least one side/surface of each storage phosphor screen is optically and/or radiographically visible.

The present invention provides a storage phosphor cassette having a single storage phosphor screen mounted on a rigid support wherein each side of the storage phosphor screen is optically and/or radiographically visible. The present invention further provides a storage phosphor cassette having two storage phosphor screens mounted on at least one rigid support wherein at least one side/surface of each storage phosphor screen is optically and/or radiographically visible.

SUMMARY OF THE INVENTION

An object of the present invention is to provide a storage phosphor cassette having one or two storage phosphor screens mounted on a rigid support.

Another object of the present invention is to provide such a storage phosphor cassette having a single storage phosphor screen wherein each side of the storage phosphor screen is optically and/or radiographically visible.

Another object of the present invention is to provide such a storage phosphor cassette having two storage phosphor screens wherein at least one side of each storage phosphor screen is optically and/or radiographically visible.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a storage phosphor cassette including a shell having a cavity and a storage phosphor assembly having a substantially rigid plate. The rigid plate is adapted to be removably contained within the cavity of the shell and is also comprised of a material which is optically and/or radiographically transparent. A single storage phosphor screen is supported on one side of the substantially rigid plate such that both surfaces of the storage phosphor screen are optically and/or radiographically visible. In a preferred embodiment, the rigid plate can be comprised of one or more layers of clear acrylic, or at least one layer of glass disposed intermediate two layers of clear acrylic.

According to another aspect of the invention, there is provided a storage phosphor cassette including a shell having a cavity and a storage phosphor assembly having a substantially rigid plate. The rigid plate is adapted to be removably contained within the cavity of the shell and is also comprised of a material which is optically and/or radiographically transparent. A first storage phosphor screen is supported on one side of the substantially rigid plate such that at least one surface of the first storage phosphor screen is optically and/or radiographically visible. A second storage phosphor screen is supported on an opposing side of the substantially rigid plate such that at least one surface of the second storage phosphor screen is optically and/or radiographically visible. In a preferred embodiment, the rigid plate can be comprised of one or more layers of clear acrylic, or at least one layer of glass disposed intermediate two layers of clear acrylic.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 8b shows a top view of the rigid insert plate of FIG. 8a.

DETAILED DESCRIPTION OF THE INVENTION

Figure 1:
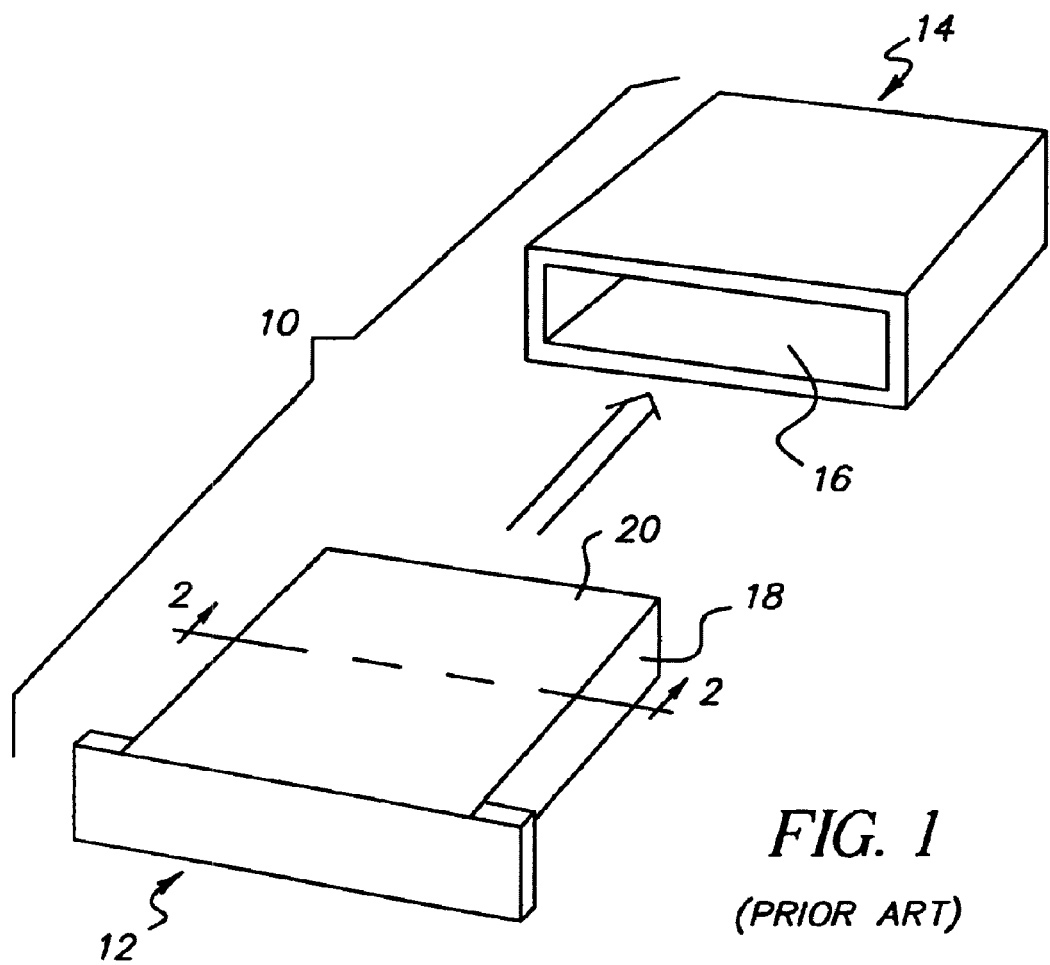
FIG. 1 shows a perspective view of a prior art storage phosphor cassette.
Figure 2:
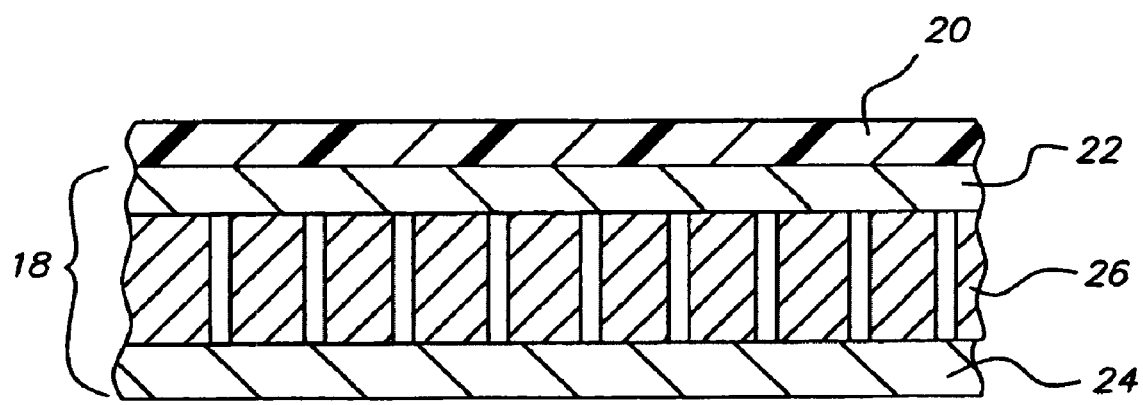
FIG. 2 shows a cross sectional view of a rigid insert plate, having a storage phosphor screen mounted thereon, taken along line 2—2 of FIG. 1.

The following is a detailed description of the preferred embodiments of the invention, reference being made to the drawings in which the same reference numerals identify the same elements of structure in each of the several figures.

In a first configuration of the present invention, with reference to FIGS. 3–10b, the present invention provides a storage phosphor cassette having a single storage phosphor screen mounted on a rigid support wherein each side of the storage phosphor screen is optically and/or radiographically clear/visible. As such, the present invention provides a rigid support for the storage phosphor which is optically clear/transparent and/or radiographically clear.

Optical/radiographic visibility of the front and back sides/surfaces of the storage phosphor screen may be desired in some computed radiography applications. For example, if both surfaces of the storage phosphor screen are read by a CR reading apparatus. That is, the reader can stimulate the storage phosphor screen to emit a radiation pattern which is captured from both surfaces of the screen for storage and use. Detecting light emitted by two surfaces of storage phosphor is more particularly described in U.S. Pat. No. 5,483,081 (Hosoi), U.S. Pat. No. 6,455,868 (Arakawa) and U.S. Pat. No. 6,462,352 (Matsumoto), which references are incorporated herein by reference.

Figure 4:
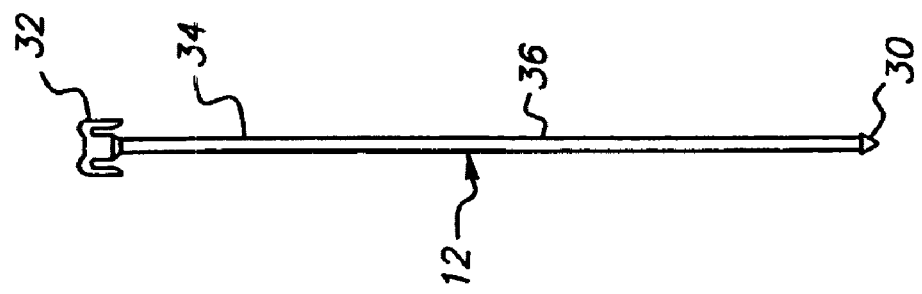
FIG. 4 shows a side view of the storage phosphor assembly of FIG. 3.
Figure 3:
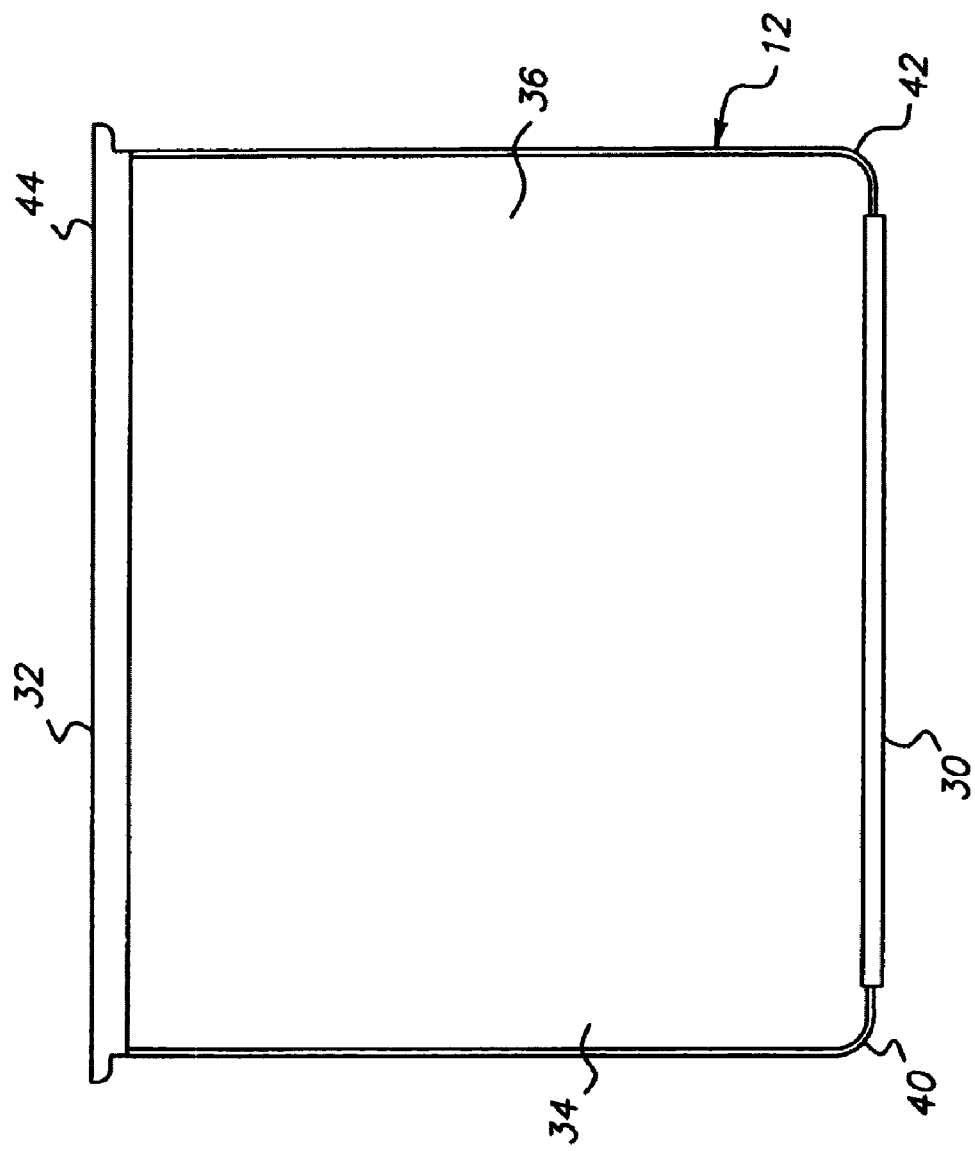
FIG. 3 shows a top view of a storage phosphor assembly in accordance with the present invention.

A storage phosphor assembly 12 in accordance with the present invention is more particularly shown in FIGS. 3 and 4. Storage phosphor assembly 12 includes a front edge 30, a back end member 32, an insert plate 34 having an upper face and being cantilevered from back end member 32, and a storage phosphor screen 36 disposed on the upper surface of insert plate 34. A front edge of insert plate 34 includes corners 40,42 which are preferably rounded. Back end member 32 can include apertures for access to the interior of back end member 32 to latch and unlatch a latch bar 44 slideably mounted therein.

As indicated above, storage phosphor assembly 12 is removably mated with shell 14 (more particularly, insert plate 34 is removably contained within cavity 16 of shell 14) such that back end member 28 of storage phosphor assembly 12 closes off cavity 16 of shell 14, thereby providing a light-tight enclosure for storage phosphor 36.

Figure 5:
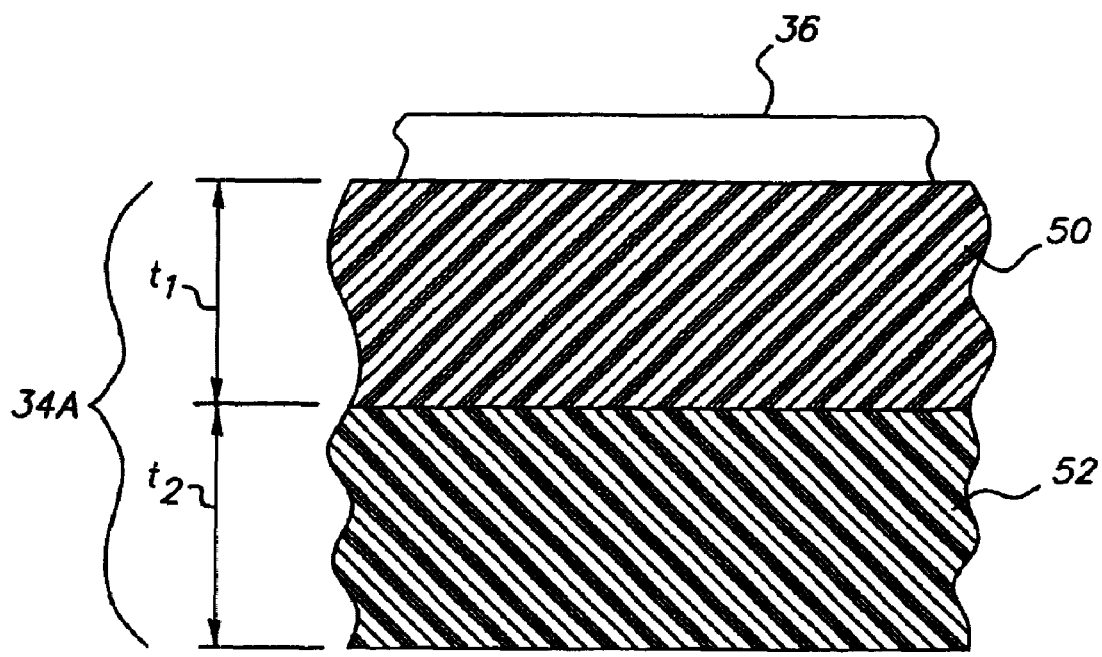
FIG. 5 shows a cross sectional view of a rigid insert plate supporting a single storage phosphor screen in accordance with a first embodiment of the present invention.

FIG. 5 shows a first embodiment of an insert plate 34A in accordance with the first configuration of the present invention.

Insert plate 34A supports storage phosphor screen 36 and is comprised of at least two layers 50,52 of clear polymer. Clear polymer layers 50,52 can be affixed using an adhesive means. In a preferred embodiment, the adhesive means is a clear adhesive (such as a pressure sensitive adhesive) or an optically/radiographically clear thermoset epoxy. Each clear polymer layer 50,52 is an optically/radiographically clear sheet. In a preferred embodiment, the clear polymer is acrylic (polymethyl methracylate or PMMA) in a UV (ultra violet) transmitting grade.

While polymer layers 50,52 do not need to be of the same thickness, for ease of manufacturing, polymer layers 50,52 are of substantially equivalent thicknesses. A thickness in the range of about 0.02 inches (0.50 mm) to about 0.10 inches (2.5 mm) has been found suitable with a thickness of about 0.05 inches (1.3 mm) being preferred.

Figure 6:
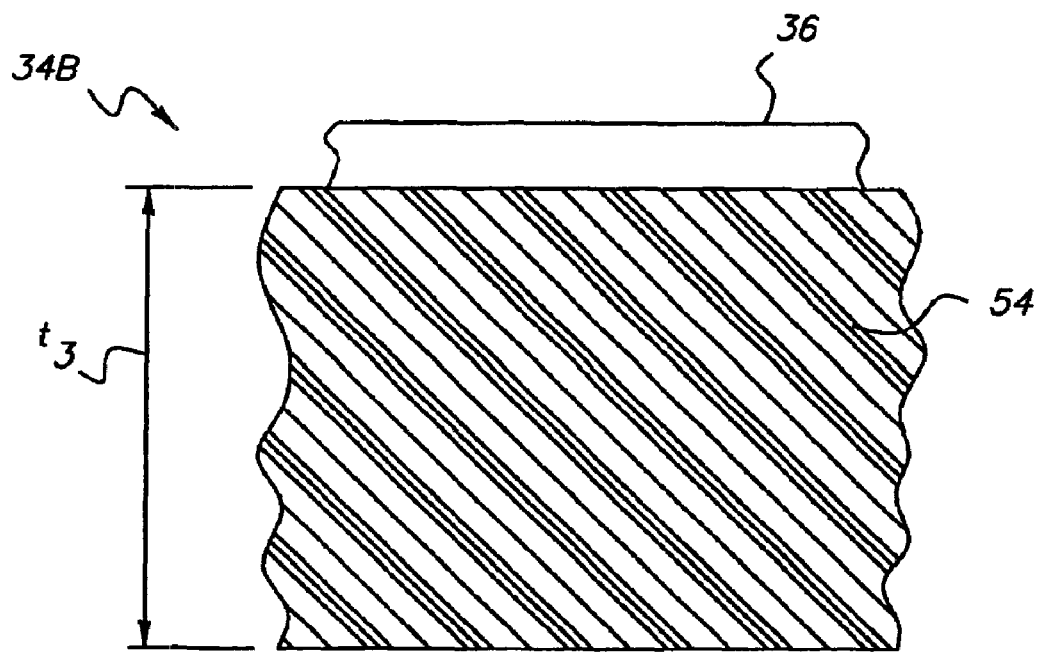
FIG. 6 shows a cross sectional view of a rigid insert plate supporting a single storage phosphor screen in accordance with a second embodiment of the present invention.

FIG. 6 shows a second embodiment of an insert plate 34B in accordance with the first configuration of the present invention.

Insert plate 34B support storage phosphor screen 36 and is comprised of a single layer 54 of clear polymer. As with the first embodiment, clear polymer layer 54 is preferably acrylic (polymethyl methracylate or PMMA) in a UV (ultra violet) transmitting grade. Polymer layer 54 can have a thickness t3 in the range of about 0.06 inches (1.5 mm) to about 0.14 inches (3.6 mm), preferably about 0.09 inches (2.3 mm).

Figure 7:
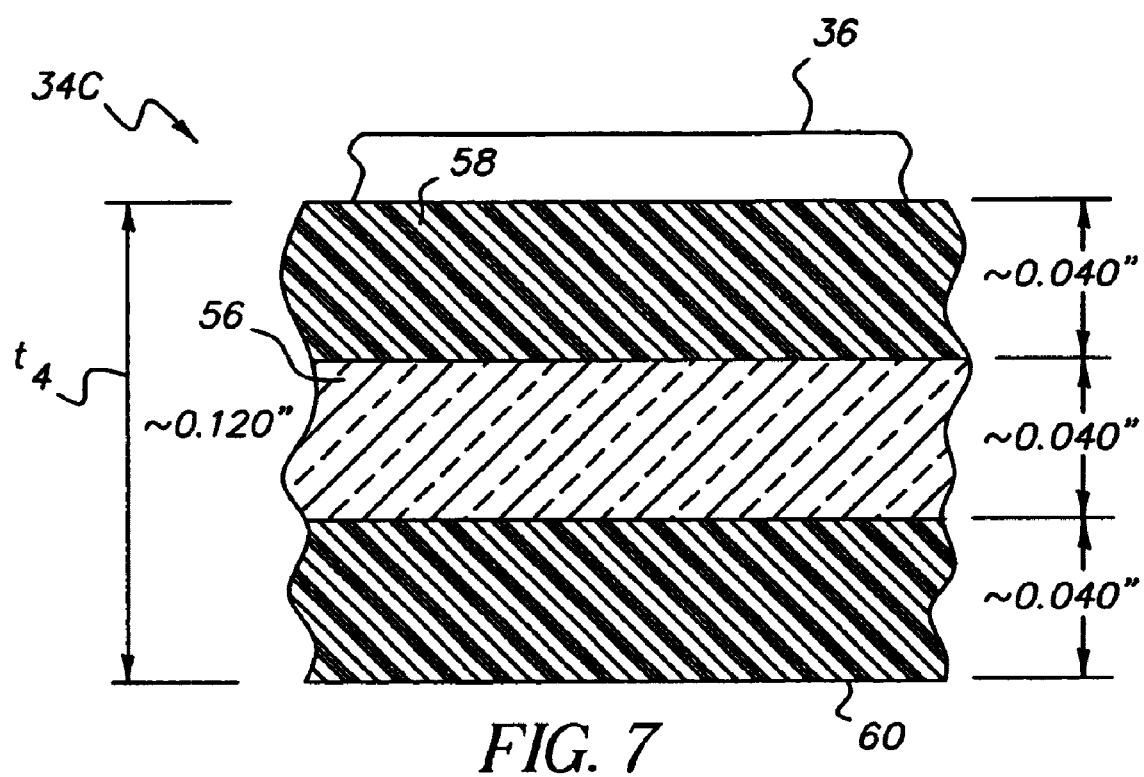
FIG. 7 shows a cross sectional view of a rigid insert plate supporting a single storage phosphor screen in accordance with a third embodiment of the present invention.

FIG. 7 shows a third embodiment of an insert plate 34C in accordance with the first configuration of the present invention.

Insert plate 34C supports storage phosphor screen 36 and is comprised of a laminate having at least three layers: a glass layer 56 disposed intermediate two clear polymer layers 58,60.

As with the first and second embodiments, clear polymer layers 58,60 are preferably acrylic (polymethyl methracylate or PMMA) in a UV (ultra violet) transmitting grade. Each clear polymer layer 58,60 can have a thickness in the range of about 0.02 inches (0.50 mm) to about 0.08 inches (2.0 mm). Preferably, each layer has a thickness of about 0.04 inches (1.0 mm). For ease of manufacturing, each of the clear polymer layers 58,60 can be substantially equivalent.

Glass layer 56 is an optically and/or radiographically clear sheet of glass having a thickness of about 0.02 inches (0.5 mm) to about 0.08 inches (2.0 mm), preferably about 0.04 inches (1.0 mm).

The combined thickness t4 of glass layer 56 and polymer layers 58,60 is in the range of about 0.06 inches (1.5 mm) to about 0.24 inches (6.1 mm), preferably about 0.12 inches (3.0 mm). For ease of manufacturing, each of the three layers 56,58,60 can be substantially equivalent, but does not need to be.

Figure 8A:
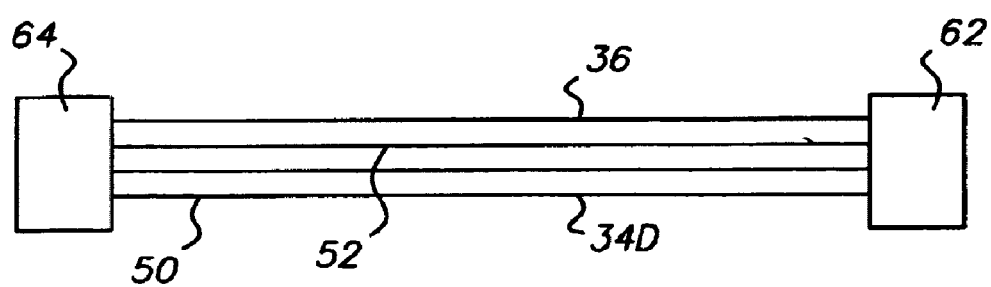
FIG. 8a shows an end view of a rigid insert plate supporting a single storage phosphor screen in accordance with a fourth embodiment of the present invention.
Figure 8B:
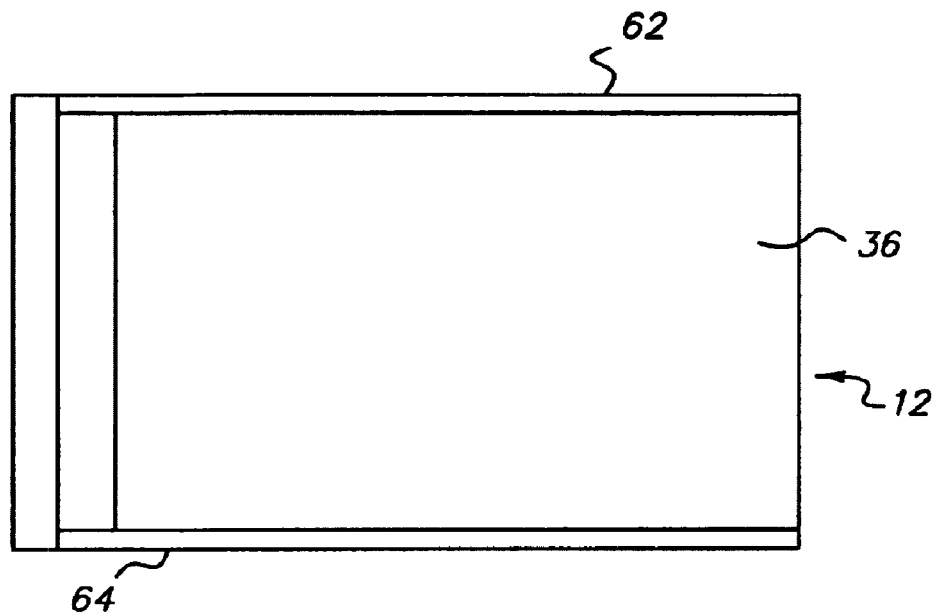

FIG. 8a is an end view of an insert plate 34D in accordance with a fourth embodiment of the first configuration of the present invention. FIG. 8b is a top view of insert plate 34D of FIG. 8a. Insert plate 34D is similar to insert plate 34A (of FIG. 5) in that insert plate 34D is comprised of at least two layers of clear acrylic. Insert plate 34D further includes edge sections 62,64 which can also be comprised of clear acrylic. Edge sections 62,64 provides support/protection for storage phosphor screen 36 by positioning screen 36 in a recessed area.

As indicated above, optical/radiographic visibility of the front and back surfaces of the storage phosphor screen may be desired for reading of both surfaces of the storage phosphor screen. The CR reader can stimulate one or both surfaces of the storage phosphor screen to emit a radiation pattern which is captured for storage and use.

Dual-sided reading can be accomplished using the storage phosphor assemblies of the present invention disclosed above. For example, FIG. 9 shows a diagrammatic side view of storage phosphor assembly 12 including the insert plate in accordance with the first embodiment (as shown in FIG. 5) wherein insert plate 34A comprises at least two clear acrylic layers for supporting storage phosphor screen 36.

Figure 9:
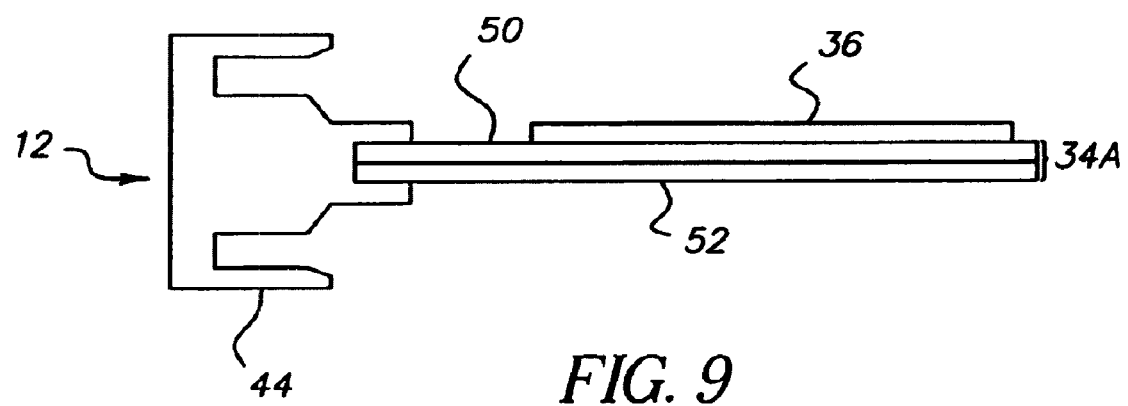
FIG. 9 shows a diagrammatic side view of a storage phosphor assembly comprising the insert plate of FIG. 5.
Figure 10A:
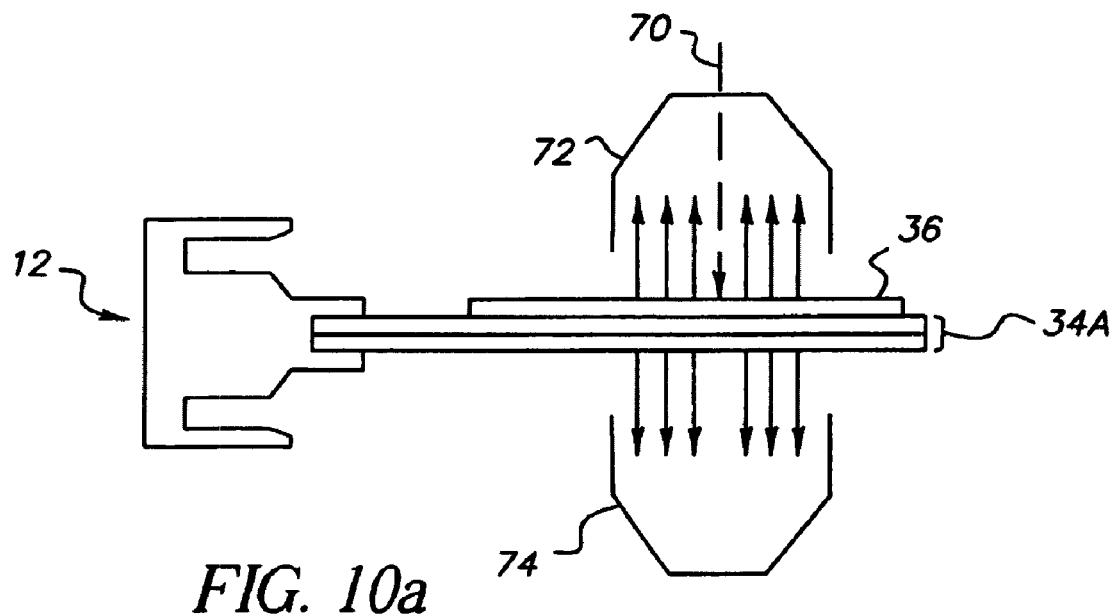
FIG. 10a shows a diagrammatic side view of the storage phosphor assembly of FIG. 9 in a dual-sided reading configuration wherein the storage phosphor screen is being stimulated from one side.

FIG. 10a shows the storage phosphor assembly 12 of FIG. 9 in a dual-sided reading configuration wherein storage phosphor assembly 12 is being stimulated from one side, and both surfaces of storage phosphor screen 36 are being read. More particularly, a stimulating light 70 is being directed toward one side of storage phosphor screen 36 to emit a radiation pattern which is captured by two light collectors 72,74, one disposed on each side of storage phosphor screen 36.

Figure 10B:
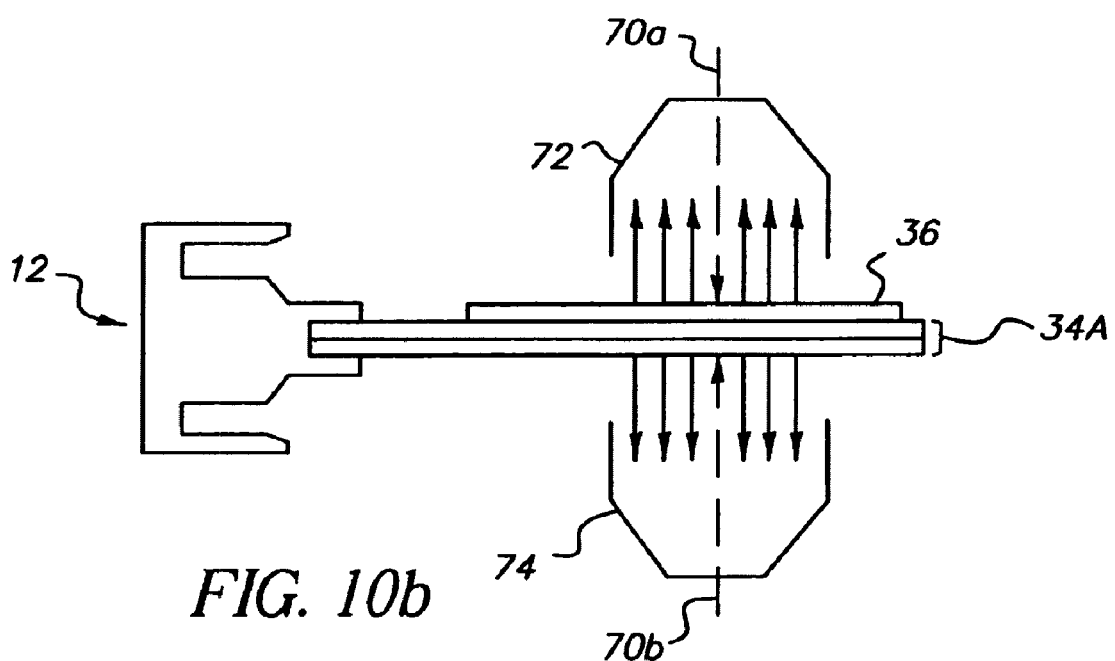
FIG. 10b shows a diagrammatic side view of the storage phosphor assembly of FIG. 9 in a dual-sided reading configuration wherein the storage phosphor screen is being stimulated from two sides.

FIG. 10b shows the storage phosphor assembly 12 of FIG. 9 in a dual-sided reading configuration wherein storage phosphor assembly 12 is being stimulated from two sides, and both surfaces of storage phosphor screen 36 are being read. More particularly, a first stimulating light 70a is being directed toward one side of storage phosphor screen 36 to emit a radiation pattern which is captured by light collector 72, disposed on a first side of storage phosphor screen 36. A second stimulating light 70b is directed toward the other side of storage phosphor screen 36 to emit a radiation pattern which is captured by light collector 74, which is disposed on a second side of storage phosphor screen 36.

Accordingly, the embodiments of the present invention described above are configured such that one or both surfaces of a single storage phosphor screen can be stimulated and emitted light from both surfaces can be collected.

Flatness of the insert plate needs to be maintained for imaging. The materials selected (i.e., polymer and glass) can provide the flatness needed by a CR reader for imaging. The selected materials also provide durability and low weight for the storage phosphor cassette.

Figure 11:
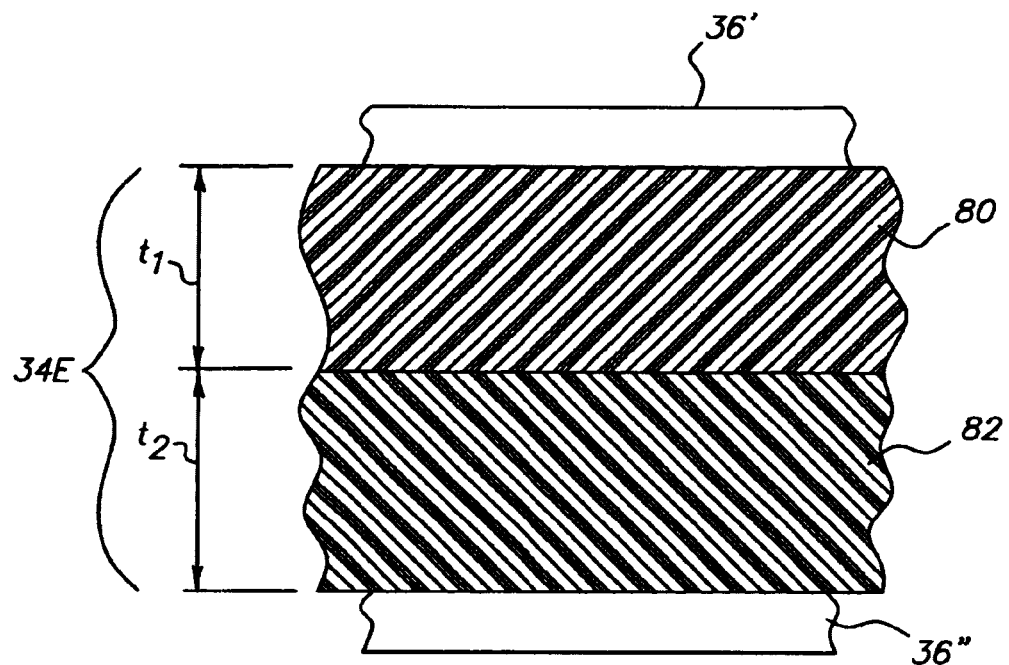
FIG. 11 shows a cross sectional view of a rigid insert plate supporting two storage phosphor screens in accordance with a fifth embodiment of the present invention.
Figure 12:
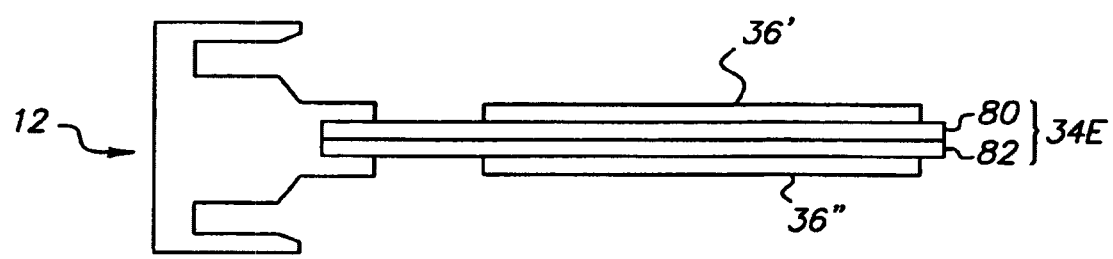
FIG. 12 shows a diagrammatic side view of a storage phosphor assembly comprising the insert plate of FIG. 11.
Figure 13:
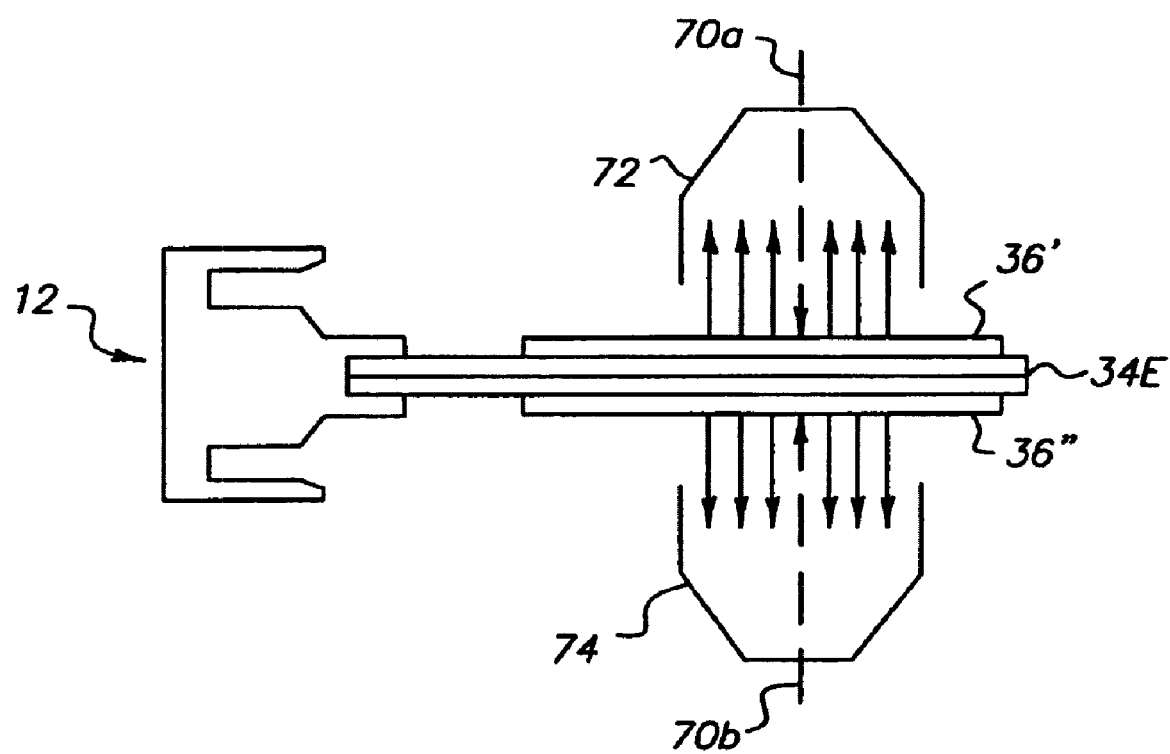
FIG. 13 shows a diagrammatic side view of the storage phosphor assembly of FIG. 12 in a dual-sided reading configuration wherein each storage phosphor screen is being stimulated.

A second configuration of the present invention is now described with reference to FIGS. 11–13, wherein two storage phosphor screens are mounted on a rigid support such that at least one side of each storage phosphor screen is optically and/or radiographically clear/visible. As such, the present invention provides a rigid support for the storage phosphor which is optically clear/transparent and/or radiographically clear.

Insert plate 34E is comprised of at least two layers 80,82 of clear polymer. Clear polymer layers 80,82 can be affixed using an adhesive means. In a preferred embodiment, the adhesive means is a clear adhesive (such as a pressure sensitive adhesive) or an optically/radiographically clear thermoset epoxy. Each clear polymer layer 80,82 is an optically/radiographically clear sheet. In a preferred embodiment, the clear polymer is acrylic (polymethyl methracylate or PMMA) in a UV (ultra violet) transmitting grade.

While polymer layers 80,82 do not need to be of the same thickness, for ease of manufacturing, polymer layers 80,82 are of substantially equivalent thicknesses. A thickness in the range of about 0.02 inches (0.50 mm) to about 0.10 inches (2.5 mm) has been found suitable with a thickness of about 0.05 inches (1.3 mm) being preferred.

A storage phosphor screen 36', 36" is supported on each side of insert plate 34E. As such, insert plate 34E is disposed intermediate storage phosphor screens 36',36".

With this embodiment, at least one surface of each screen is optical/radiographic visible for reading. As such, the insert plate 34E can be employed in a dual-screen reading configuration as shown in FIG. 13. FIG. 13 shows the storage phosphor assembly 12 of FIG. 12 in a dual-screen reading configuration wherein storage phosphor assembly 12 is being stimulated from two sides, and at least one surface if each storage phosphor screen 36',36" is being read. More particularly, a first stimulating light 70a is being directed toward first storage phosphor screen 36' to emit a radiation pattern which is captured by light collector 72, disposed on a one side of storage phosphor screen 36'. A second stimulating light 70b is directed toward second storage phosphor screen 36" to emit a radiation pattern which is captured by light collector 74, which is disposed on a one side of storage phosphor screen 36".

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 cassette assembly
12 storage phosphor assembly
14 shell 16 cavity
18 insert plate
20 storage phosphor screen
22,24 rigid layers
26 honeycomb layer
28 back end member
30 front edge
32 back end member
34a–d insert plate
36 storage phosphor screen
40,42 corners
44 latch extrusion
50,52 polymer layers
54 polymer layer
56 glass layer
58,60 clear polymer layers
62,64 edge sections
70 stimulating light
72,74 light collectors
80,82 clear polymer layers

The invention claimed is:

1. A storage phosphor cassette, comprising:
a shell having a cavity;
a storage phosphor assembly having a substantially rigid plate adapted to be removably contained within the cavity of the shell, the rigid plate being optically and/or radiographically transparent, wherein the rigid plate is comprised of at least one layer of glass disposed intermediate two layers of clear acrylic; and
a single storage phosphor screen supported on one side of the substantially rigid plate such that both surfaces of the storage phosphor screen are optically and/or radiographically visible.

2. The storage phosphor cassette of claim 1 wherein the glass is affixed to the clear acrylic using a clear adhesive.

3. The storage phosphor cassette of claim 1, wherein the two acrylic layers and the glass layer are laminated together using an optically and radiographically clear thermoset epoxy.

4. The storage phosphor cassette of claim 1, wherein the shell is comprised of an upper panel and a lower panel, a first and second side member, and a front end member, the first and second side members and front end member joining the upper and lower panels to define the cavity having an open end.

5. The storage phosphor cassette of claim 4, wherein the storage phosphor assembly further comprises a back end member having two ends, and the storage phosphor assembly is adapted to be removably contained within the shell such that the back end member closes off the open end of the shell.

6. A storage phosphor cassette, comprising:
a shell having a cavity;
a storage phosphor assembly having a substantially rigid plate adapted to be removably contained within the cavity of the shell, the rigid plate being optically and/or radiographically transparent;
a first storage phosphor screen supported on one side of the substantially rigid plate such that at least one surface of the first storage phosphor screen is optically and/or radiographically visible; and
a second storage phosphor screen supported on an opposing side of the substantially rigid plate such that at least one surface of the second storage phosphor screen is optically and/or radiographically visible.

7. The storage phosphor cassette of claim 6, wherein the rigid plate is comprised of at least one layer of clear acrylic.

8. The storage phosphor cassette of claim 7 wherein the rigid plate is comprised of at least two layers of clear acrylic, and the two layers are affixed using a clear adhesive.

9. The storage phosphor cassette of claim 6, wherein the rigid plate is comprised of at least one layer of glass disposed intermediate two layers of clear acrylic.

10. The storage phosphor cassette of claim 9 wherein the glass is affixed to the clear acrylic using a clear adhesive.

11. The storage phosphor cassette of claim 9, wherein the two acrylic layers and the glass layer are laminated together using an optically and radiographically clear thermoset epoxy.

* * * * *